United States Patent
Tecu et al.

(10) Patent No.: US 7,202,888 B2
(45) Date of Patent: Apr. 10, 2007

(54) ELECTRONIC IMAGING DEVICE RESOLUTION ENHANCEMENT

(75) Inventors: Kirk Steven Tecu, Longmont, CO (US); William Robert Haas, Fort Collins, CO (US); David W. Boll, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 850 days.

(21) Appl. No.: 10/300,237

(22) Filed: Nov. 19, 2002

(65) Prior Publication Data

US 2004/0095470 A1    May 20, 2004

(51) Int. Cl.
*H04N 5/228*    (2006.01)

(52) U.S. Cl. .............. 348/208.11; 348/241; 358/1.2; 358/3.07; 359/813; 382/298; 382/299

(58) Field of Classification Search .......... 348/241, 348/208.11; 382/260–265, 275, 298, 299; 359/16, 813; 358/3.26, 1.2, 3.07
See application file for complete search history.

(56) References Cited

U.S. PATENT DOCUMENTS

| | | | |
|---|---|---|---|
| 5,067,019 A | * | 11/1991 | Juday et al. ............... 348/580 |
| 5,103,306 A | | 4/1992 | Weiman et al. |
| 5,185,667 A | * | 2/1993 | Zimmermann ......... 348/207.99 |
| 5,489,940 A | * | 2/1996 | Richardson et al. ........ 348/315 |
| 5,990,941 A | * | 11/1999 | Jackson et al. ........ 348/207.99 |
| 5,999,660 A | * | 12/1999 | Zorin et al. ................. 382/276 |
| 6,147,709 A | * | 11/2000 | Martin et al. ............... 348/239 |
| 6,738,057 B1 | * | 5/2004 | Campbell .................... 345/611 |
| 7,058,237 B2 | * | 6/2006 | Liu et al. .................... 382/276 |
| 2002/0113884 A1 | * | 8/2002 | Tanii et al. ................. 348/241 |
| 2002/0122117 A1 | * | 9/2002 | Nakagawa et al. ......... 348/218 |
| 2004/0042782 A1 | * | 3/2004 | Yoshikawa et al. ......... 396/322 |

OTHER PUBLICATIONS

DARPA MARS program research progress for "Robust Navigation by Probabilistic Volumetric Sensing" project of Hans Moravec, Carnegie Mellon University, Jan. 20, 2000, available at http://www.frc.ri.cmu.edu/~hpm/project.archive/robot.papers/2000/ARPA.MARS.reports.00/Report.0001.html, 6 pages.

* cited by examiner

*Primary Examiner*—Tuan Ho
*Assistant Examiner*—Chriss S. Yoder

(57) ABSTRACT

A method of enhancing resolution in an electronic imaging device includes capturing an electronic image through a fisheye lens with a photodetector at a resolution native to the photodetector. A resolution is selected that is higher than the native resolution of the photodetector. The electronic image is processed to produce a new electronic image at the higher resolution. A fisheye effect caused by the fisheye lens is removed during processing.

7 Claims, 6 Drawing Sheets

ELECTRONIC IMAGING DEVICE RESOLUTION ENHANCEMENT

BACKGROUND

Electronic imaging devices such as digital cameras are used in a wide range of applications and are steadily becoming less expensive and simpler to use. Electronic images may be stored indefinitely without the image degradation suffered by film-based images. Electronic imaging devices generate images that can be viewed immediately and used in a variety of ways such as printing, posting to a web page on the World Wide Web, transmitting to others by electronic mail (email) or other means, etc. They can also rapidly capture large numbers of images which can be previewed and stored or deleted as desired. As the capacity of removable solid-state memories has increased and price has gone down, typical electronic imaging devices can now capture and internally store hundreds of electronic images.

Electronic imaging devices, such as digital cameras, typically convert light to electrical signals using a two dimensional photodetector. The photodetector contains a two dimensional array of thousands or even millions of light-sensitive cells, each capturing one picture element (or pixel) of an image. As an image is focused onto the photodetector, an electrical charge builds up in the photodetector cells. The magnitude of the electrical charge corresponds to the intensity of the image light—brighter light generates a larger electrical charge. Thus, the image light focused on the photodetector generates a pattern of varying electrical charges across the photodetector. The magnitude of the electrical charges across the photodetector are analyzed and stored in the electronic imaging device as an electronic representation of the image. In a digital imaging device such as a digital camera, the magnitude of the electrical charges is converted into a number in an analog to digital (A/D) converter.

Electronic imaging devices are rapidly becoming more popular and are gaining widespread acceptance due to the utility of electronic images and to the increasing quality of the electronic imaging devices. However, one of the most expensive components in an electronic imaging device continues to be the photodetector. Doubling the resolution of the photodetector in an electronic imaging device can more than double the cost of the electronic imaging device.

SUMMARY

Resolution is enhanced in an electronic imaging device by increasing the number of pixels in the photodetector used to capture the main image subjects near the center of the frame, while reducing the number of pixels used to capture the edges. This is accomplished by using a spherical or fisheye lens which expands the center of the frame while contracting the edges, effectively assigning more pixels in the photodetector to the portion of the image at the center of the frame. The resulting fisheye image may then be filtered to project the image data back into a higher resolution flat image, removing the fisheye effect. The resolution of the resulting flat image is set at the best effective resolution at the center of the fisheye image. The electronic filter used to remove the fisheye effect may interpolate at the edges of the flat image using the dispersed pixels from the fisheye image to fill in the higher resolution pixels at the edges of the flat image.

BRIEF DESCRIPTION OF THE DRAWING

Illustrative embodiments of the invention are shown in the accompanying drawing, in which.

DESCRIPTION

Figure 1:
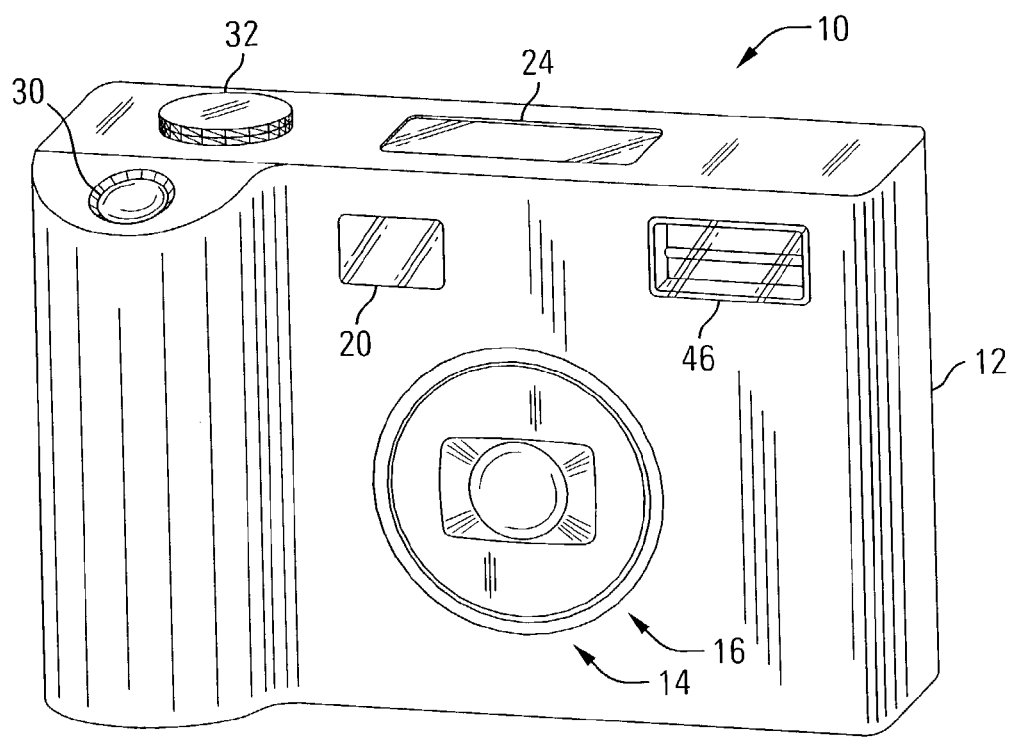
FIG. 1 is an isometric front view illustration of an exemplary embodiment of an electronic imaging device with enhanced resolution.

The drawing and description, in general, disclose an electronic imaging device with resolution enhancement. Resolution is enhanced in the electronic imaging device over the native resolution of a photodetector in the electronic imaging device. This resolution enhancement is achieved by using a lens in the electronic imaging device that optically magnifies or expands a portion of the image frame while compressing the rest of the frame. An exemplary lens for performing this type of function is a spherical lens such as a fisheye lens, whose optical properties are designed to magnify or expand a portion of the image and compress others. Although the term fisheye lens is used herein in the discussion of the exemplary embodiments, it is important to note that the lens used for resolution enhancement is not limited to any particular type or configuration of lens, including a commercially available fisheye lens. Rather, the lens may be a cylindrical lens, etc, or any lens that distorts an image so that the distortion may be removed while increasing resolution, and the term fisheye lens as used herein is to be construed in that broad sense.

This optically redistributes the image across the photodetector in the electronic imaging device, allocating more of the pixels to the region of interest in the image than is the case with a typical lens, and less pixels to peripheral regions such as background regions. In effect, the pixels-per-inch (PPI) value is increased in the region of interest and decreased everywhere else in the electronic imaging device. The resulting output PPI value is the true optical resolution in the region of interest and is increasingly interpolated toward the periphery of the imaging device.

After the image is captured with the fisheye lens, it is electronically processed to remove the apparent distortion (referred to herein as the fisheye effect) caused by the fisheye lens. This electronic processing flattens the image, removing the appearance of magnification or warping so that the image has a uniform output PPI throughout. In order to enhance the resolution in the electronic imaging device, the flattened image has a PPI value selected from a magnified region, so that the resulting resolution is higher than the native resolution of the photodetector. The compressed regions are expanded and filtered to match the resolution of the magnified region. Thus the resolution in the region of interest is optically enhanced and the resolution in the background region is digitally enhanced to match.

Resolution enhancement using a fisheye lens in an electronic imaging device effectively provides higher resolution without the dramatic increase in cost that a higher resolution photodetector would entail. A greater percentage of the pixels in the photodetector are dedicated to capturing the region of interest rather than the background. A general purpose, low cost electronic imaging device may thus be used to capture a great deal of detail in the region of interest. For example, a general purpose electronic imaging device may be suitable for capturing acceptable images of every day events, but not for capturing a high quality portrait of a person against a canvas background. By optically enhancing the resolution in the region of the subject using a fisheye lens, the same low-cost electronic imaging device may be used to capture superior detail of the subject at the expense of the canvas background, which does not require the same level of detail. The resolution of the background may then be digitally enhanced to match, so that the resolution of areas of interest is optically enhanced, and the resolution of background areas is digitally enhanced to match.

Resolution enhancement using a fisheye lens may be employed with any type of electronic imaging device. Although resolution enhancement will be described herein with respect to a digital camera, it is important to note that it is not limited to use with any particular type of imaging device. For example, the electronic imaging device may alternatively comprise a video camera, a scanner, etc. Before describing resolution enhancement using a fisheye lens in detail, an exemplary digital camera which may be adapted for enhanced resolution will be described.

Figure 2:
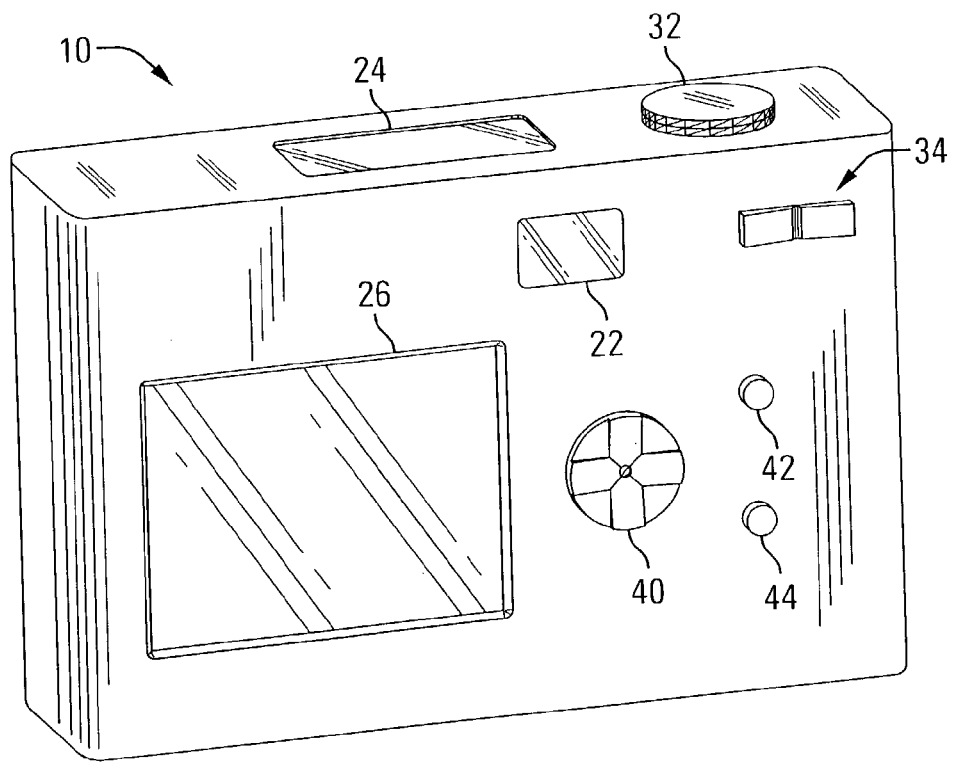
FIG. 2 is an isometric rear view illustration of the exemplary embodiment of the electronic imaging device of FIG. 1.

Referring now to FIGS. 1 through 2, an exemplary digital camera 10 comprises a housing portion or body 12 which is sized to receive the various systems and components required by the digital camera 10. For example, in the embodiment shown and described herein, the body 12 is sized to receive external components including a lens assembly 14 and fisheye lens 16, viewfinder windows 20 and 22 and display devices 24 and 26. Control buttons such as a shutter control button 30, a mode dial 32, a zoom control switch 34, and others (e.g., 40, 42, and 44) as needed are also provided on the outside of the body 12. The digital camera 10 may include an illumination system such as a flash 46 mounted on the outside of the body 12.

Figure 3:
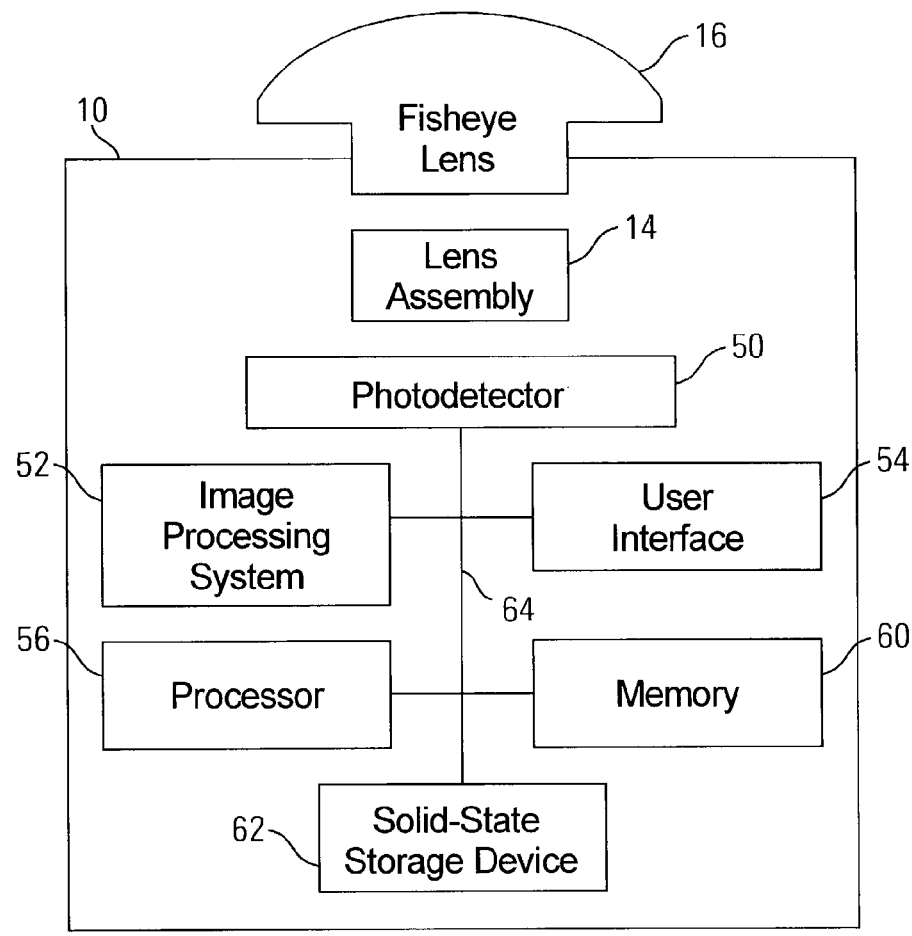
FIG. 3 is a block diagram of an exemplary embodiment of an electronic imaging device.

Internal components of the digital camera 10 are illustrated in the block diagram of FIG. 3, including a photodetector 50, an image processing system 52 to process and format the image data captured by the photodetector 50, and a user interface 54 to provide and process menus, process button input, communicate with external devices, etc. The image processing system 52 of an exemplary embodiment may consist of instructions for electronically filtering an image to remove a fisheye effect. These instructions may be computer executable firmware or hardwired electronic circuitry for performing the desired function, or any other suitable instructions executable by the digital camera 10 for filtering an image to remove a fisheye effect.

The image processing system 52 and user interface 54 may comprise standalone components, or may comprise firmware that is executed in a processor 56. The processor 56 may also perform other needed tasks such as controlling the operation of the digital camera 10 as directed by the user interface 54. The processor 56 may comprise one or more general purpose processors. Alternatively, the processor 56 may comprise one or more application specific integrated circuits (ASICs) or other task-specific processors. The digital camera 10 may include an internal memory 60 to provide temporary storage during image processing operations, to act as a buffer during image capture operations, or to aid in any other operations that require internal storage space. A solid-state storage device 62 may also be provided in the digital camera 10 to store images and transfer them to other devices such as a printer or computer. The various components of the digital camera 10 (e.g., 56, 60, etc.) may be connected by a bus 64.

Please note that the exemplary digital camera 10 is not limited to the elements described herein or to the configuration described herein. For example, as mentioned above, the image processing system 52 and user interface 54 may be separate components in the digital camera 10, or may consist of firmware stored in one or more read-only memories (ROMS) that is executed by a processor 56. As the electronic imaging device is not limited to a digital camera 10, so the exemplary digital camera 10 is not limited to any particular configuration to provide the benefits of resolution enhancement.

The foregoing systems and devices of the digital camera 10 will now be described in more detail.

Image light enters the digital camera 10 through the lens assembly 14 and fisheye lens 16. The photodetector 50 detects the image light focused thereon by the lens assembly 14 and fisheye lens 16. In one exemplary embodiment the photodetector 50 comprises a charge-coupled device (CCD), although other types of photodetectors may be used. A typical CCD comprises an array of individual cells or pixels, each of which collects or builds up an electrical charge in response to exposure to light. Because the quantity of the accumulated electrical charge in any given cell or pixel is related to the intensity and duration of the light exposure, a CCD may be used to detect light and dark spots in an image focused thereon.

The term image light as used herein refers to the light, visible or otherwise, that is focused onto the surface of the photodetector by the lens assembly 14 and fisheye lens 16. The image light may be converted into digital signals in essentially three steps. First, each pixel in the photodetector converts the light it receives into an electric charge. Second, the charges from the pixels are amplified by an analog amplifier. Finally, the amplified analog charges are digitized by an analog-to-digital (A/D) converter, representing the voltage level of each amplified charge with a number. The digital data may then be processed and/or stored as desired.

The image data captured by the photodetector 50 may be buffered and processed in the internal memory 60 and stored in the solid-state storage device 62 in the digital camera 10. The solid-state storage device 62 may comprise any suitable type of memory, such as a removable rewriteable non-volatile memory, random access memory (RAM), or any other solid state storage medium. For example, the solid-state storage device 62 in the exemplary digital camera 10 may comprise a Compact Flash or SmartMedia memory card.

The image processing system 52 processes the image data to flatten the image and remove the fisheye effect, as will be described in more detail below. As discussed above, the image processing system 52 may comprise any suitable device such as a microprocessor and computer-executable instructions in an associated memory, or a hard-coded device such as an ASIC. The image processing system 52 processes image data to scale images for display on a graphical display device 26, among other tasks. The graphical display device 26 comprises a liquid crystal display (LCD) or any other suitable display device. An alphanumeric display device 24 on the digital camera 10 also comprises an LCD or any other suitable display device, and is used to indicate status information, such as the number of images that can be captured and stored in the solid-state storage device 62, and the current mode of the digital camera 10.

The user interface 54 may also be implemented using any suitable device such as a microprocessor and computer-executable instructions in an associated memory, or a hard-coded device such as an ASIC. The user interface 54 may process input from the buttons (e.g., 30) on the digital camera 10, communicate with external devices, and provide menus and other aids to the user.

The digital camera 10 may also include other components, such as an audio system. However, digital cameras are well-known in the art and could be adapted for enhanced resolution as described herein by persons having ordinary skill in the art after having become familiar with the teachings of the present invention. Therefore, the components of the digital camera 10 utilized in one embodiment of the present invention, as well as the various ancillary systems and devices that may be utilized in one embodiment of the present invention, will not be described in further detail herein.

During operation of the digital camera 10, the digital camera 10 is turned on and off by one of the control buttons such as the mode dial 32, and a mode is selected, such as a single or multiple exposure mode. The digital camera 10 is oriented with the lens assembly 14 and fisheye lens 16 directed at a subject. The subject may be monitored either through a viewfinder 20 and 22, or on the graphical display panel 26. If the lens assembly 14 is a zoom lens, the focal length may be adjusted by pressing a control button such as the zoom control switch 34.

As the shutter control button 30 is pressed, the lens assembly 14 is adjusted to focus image light from the subject onto the photodetector 50. The flash 46 illuminates the subject, if needed. The photodetector 50 then converts the image light directed thereon by the lens assembly 14 and fisheye lens 16 into electrical image data, which are processed to remove the fisheye effect and stored in the solid-state storage device 62.

Now that an exemplary digital camera 10 that may capture electronic images has been described, the resolution enhancement using a fisheye lens will be described in more detail.

The term fisheye lens as used herein refers to any lens that magnifies at least one portion of the image while compressing other areas of the image. The fisheye lens 16 may consist of a single element or multiple elements and may be constructed of any desired material such as glass or plastic, with or without coatings. The fisheye lens 16 may comprise a circular lens, although the exemplary embodiments described herein comprise full-frame lenses so that the magnification and compression effects are smoothly distributed over the entire image and may more readily be removed by electronic processing. The fisheye lens 16 may be designed to capture the same field of view as a standard non-fisheye lens (e.g., 12) in the digital camera 10, but which still provides the fisheye effect of optically magnifying a portion of the image while compressing the rest.

This optical magnification may be a natural product of the perspective of a fisheye lens having an extremely wide field of view, wherein the center appears magnified and the edges appear compressed. Alternatively, the fisheye lens 16 used for resolution enhancement in the digital camera 10 may be designed to provide an exaggerated magnifying effect, or to position the magnified region in any desired location in the image, or to control the shape of the magnified region. For example, it may be desirable for the magnified region to have an oval or rectangular shape rather than circular. As the fisheye effect is removed digitally, various optical magnification and compression effects may be removed.

Figure 4:
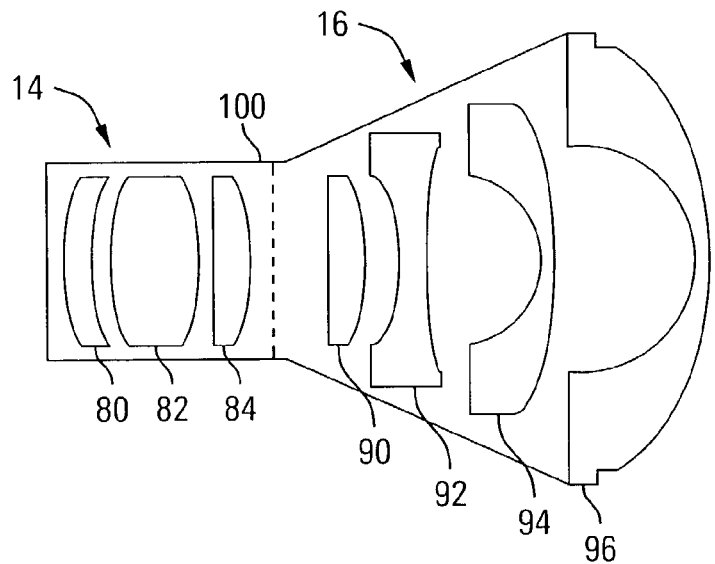
FIG. 4 is a cross-sectional illustration of an exemplary lens assembly and a fisheye lens.

An exemplary cross-sectional illustration of the lens assembly 14 and fisheye lens 16 is shown in FIG. 4. The lens assembly 14 may comprise one or more optical elements 80, 82, and 84. The lens assembly 14 of the exemplary embodiment comprises a typical lens assembly 14 for capturing electronic images in a digital camera 10. The fisheye lens 16 also may comprise one or more optical elements 90, 92, 94, and 96 as needed to provide the desired configuration of optical magnification and compression.

The lens assembly 14 and fisheye lens 16 may be mounted in a single housing 100, or may be separately mounted. For example, the lens assembly 14 may be permanently mounted in the digital camera 10, while the fisheye lens 16 may be a removable accessory which the user may attach when enhanced resolution is desired. In the latter case, digital processing of image data to remove the fisheye effect may be triggered either automatically when the fisheye lens 16 is attached to the digital camera 10, or manually by selecting an option in a user menu on the graphical display panel 26 or by selecting a mode on the mode dial 32. It may also be desirable to be able to turn off digital processing of image data when the fisheye lens 16 is in place to enable the digital camera 10 to capture images having the fisheye effect. The fisheye lens 16 may also be movably mounted in the digital camera 10 so that it may automatically pivot in and out of the optical path leading into the lens assembly 14 to the photodetector 50. In this case, the fisheye lens 16 is likely mounted inside the body 12 of the digital camera 10 or just on the front face of the digital camera 10.

The digital camera 10 may also be modified to facilitate the image composition process when the fisheye lens 16 is in place. Normally, a video stream of thumbnail images is displayed on the graphical display panel 26 to aid in image composition. The frame rate of the video stream is typically somewhere between about 10 frames per second (fps) and 30 fps. The image processing system 52 captures sample images from the photodetector 50 in real time and scales them down to the reduced resolution of the graphical display panel 26, if the photodetector 50 is not capable of capturing reduced resolution images. However, with the fisheye lens 16 in place, the photodetector 50 captures images which appear distorted by the fisheye effect. If the image processing system 52 is sufficiently fast to also flatten the images in the video stream in real time, the graphical display panel 26 may continue to display images to aid in the image composition process. If the image processing system 52 is only nearly fast enough, it may be sufficient to reduce the video frame rate somewhat to enable real-time video of flattened images to be displayed on the graphical display panel 26 during composition, but at a choppier frame rate.

However, if the image processing system 52 is not fast enough to flatten images in real-time, the graphical display panel 26 may be disabled during image composition, or may simply display a video stream made of images that appear distorted by the fisheye effect. In the latter case, it may be desirable to overlay a graphic on the video stream on the graphical display panel 26, illustrating what will be captured in the final image. If the graphical display panel 26 is disabled during image composition, the user may compose the image using the viewfinder 20 and 22.

Alternatively, the digital camera 10 may continue to capture and store images with the fisheye effect at the desired frame rate, such as 30 fps, and flatten only a portion of them at a lower rate for display on the graphical display panel 26 during composition. In this case, the remaining images may be flattened later in a post-processing operation.

Note that the fisheye lens 16 in the exemplary embodiment does not affect the viewfinder 20 and 22. The fisheye lens 16 and viewfinder 20 and 22 are designed so that the viewfinder 20 and 22 displays an accurate representation of the image that will be captured by the fisheye lens 16 and flattening process.

In an alternative embodiment in which the fisheye lens 16 is movably mounted in the digital camera 10, the fisheye lens 16 may be moved out of the optical path during composition, and flipped back into place over the lens assembly 14 when the shutter control button 30 is pressed.

Figures 5, 6:
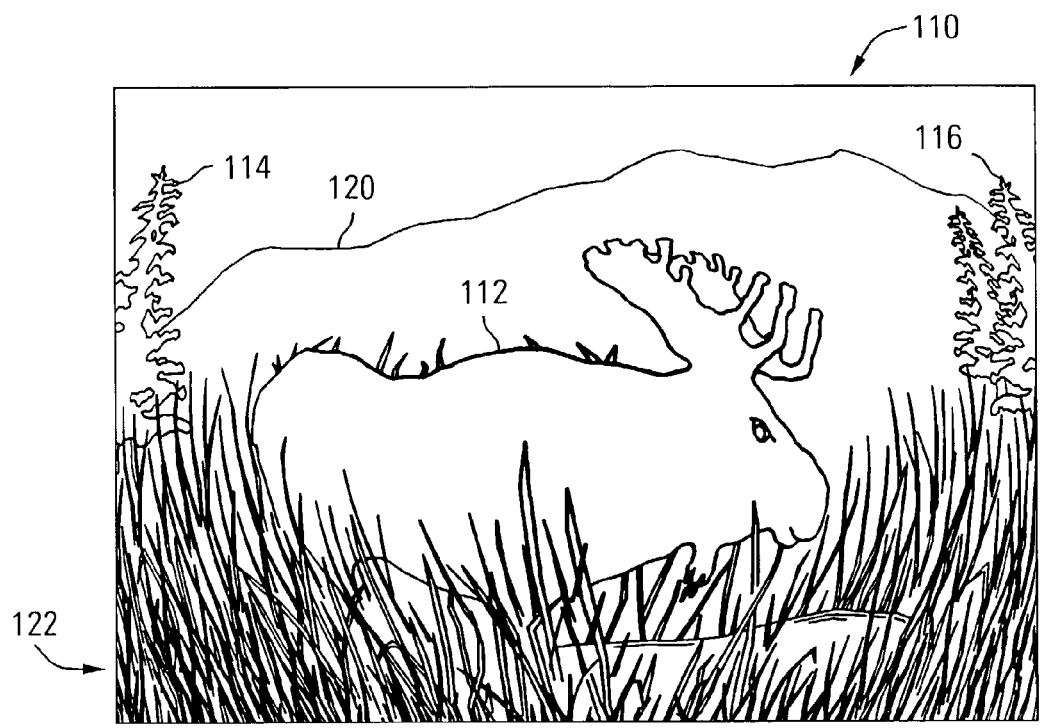
FIG. 5 is an exemplary image captured through a fisheye lens in an electronic imaging device.
FIG. 6 is a matrix illustrating an exemplary distribution of pixels captured through a fisheye lens in an electronic imaging device.

Referring now to FIG. 5, an exemplary image 110 captured through a fisheye lens 16 in a digital camera 10 is shown. Note that the image appears distorted by a fisheye effect, so that a moose 112 is magnified and trees 114 and 116, a mountain 120 and grass 122 are compressed. This exemplary image 110 illustrates the use of a full-frame fisheye lens, showing a smooth gradient between magnification in the center to compression at the edges caused as a result of the wide field of view in the fisheye lens 16. As discussed above, because the fisheye effect is removed digitally, the fisheye lens 16 could alternatively produce any desired pattern, size, and location of magnification and compression.

An exemplary grid or matrix 130 of pixels is illustrated in FIG. 6. A very small number of pixels is shown for simplicity, rather than show the millions of pixels of a typical photodetector 50. Note that the pixels (e.g. 132, 134) have a consistent size and are distributed evenly across the matrix 130, with a uniform number of pixels-per-inch (PPI). The image captured through the fisheye lens 16 by the photodetector 50 thus has a uniform PPI, except that in this case the center of the image (the moose 112) is magnified onto the photodetector 50. Therefore, the moose 112 therefore effectively receives a greater PPI that the background 114, 116, 120, and 122. The resulting image captured by the photodetector 50, apparently distorted by a fisheye effect, is subsequently processed to remove the fisheye effect, generating a flattened image with a resolution that is higher than the native resolution of the photodetector 50.

Figure 7:
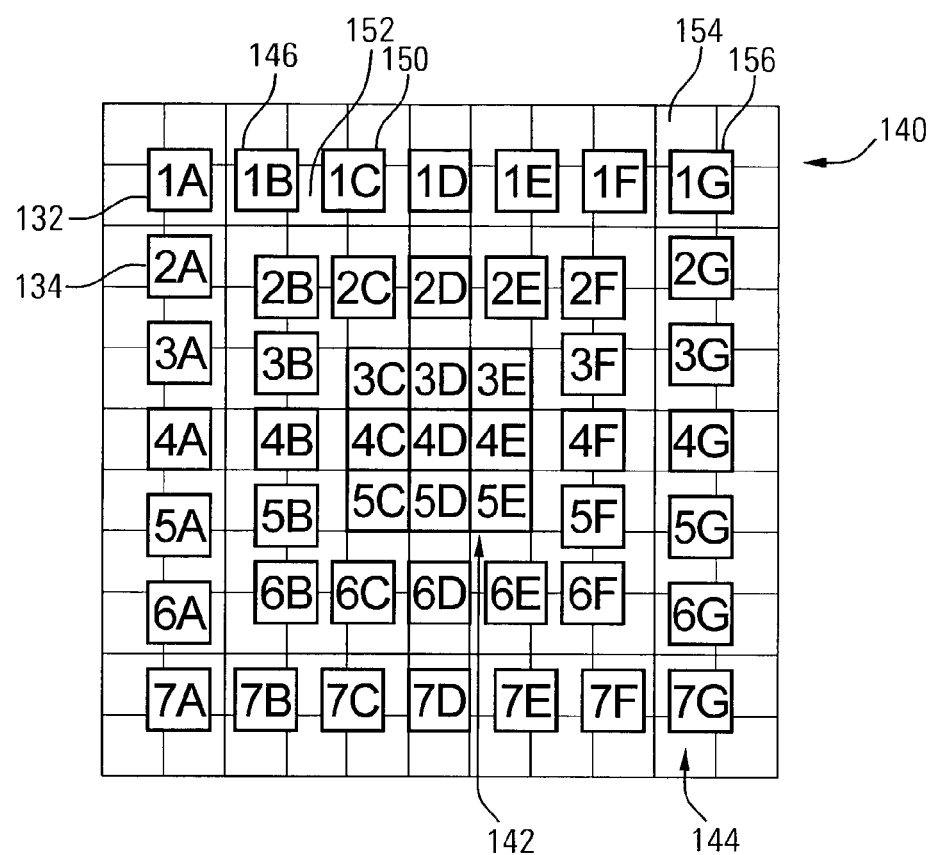
FIG. 7 is an expanded matrix illustrating an exemplary distribution of the pixels of FIG. 6, with the pixels projected into the expanded matrix to remove the fisheye effect.

The fisheye effect may be removed by any electronic process desired. For example, the pixels in the image data may be projected into the appropriate locations in a larger, higher resolution image, as illustrated in FIG. 7. The pixels (e.g., 132 and 134) are mapped from their positions in the original fisheye image to their proper locations in the flattened image, represented by the matrix 140 in FIG. 7. The original sample matrix has a resolution of 7×7 pixels for a total of 49, which is projected into an enhanced resolution matrix of 11×11 pixels for a total of 121. Note that in this example, the fisheye lens has magnified the center of the image, and has compressed the edges increasingly more as the distance from the center of the image grows. Thus, when mapping the pixels into the proper locations, those pixels 142 near the center of the image may not be greatly moved, while those 144 near the edges are spread more widely. Although it would be possible to flatten the image by moving pixels closer together in the magnified regions during the mapping process, resolution is enhanced in the digital camera 10 by maintaining the PPI value in the magnified area of the fisheye image. In other words, the highest resolution, or PPI, in the magnified area of the image is selected to be the new enhanced resolution of the flattened image. This is accomplished in the exemplary embodiment by spreading pixels in the mapping process, rather than compressing them by moving them closer together.

Note that the distribution of pixels (e.g., 132, 134) in the remapped matrix 140 is purely for purposes of the discussion, and the remapping function is not limited to this distribution pattern. The actual remapping function distributes pixels (e.g., 132, 134) as needed to flatten the image, according to the optical characteristics of the fisheye lens 16. The appropriate positions for pixels in the remapping process may be determined during the design process of the fisheye lens 16 using well known ray tracing techniques. Alternatively, the appropriate positions may be dynamically calculated in a calibration procedure by imaging a test pattern such as an array of dots through the fisheye lens 16, then calculating the projection needed to move the dots from their places in the fisheye image back to the known actual places in the flattened image. The remapping may be accomplished using a lookup table to determine proper pixel locations, or by calculating proper pixel locations according to one or more equations, or a combination of the two techniques, or any other suitable method of determining proper pixel location. The image may alternatively be flattened using any suitable technique, including techniques other than remapping pixels to new locations. As the manipulation of images to create or remove optical patterns or distortions is well known (e.g., the optical effects widely available in photo-manipulation software), and as it depends upon the optical characteristics of the fisheye lens 16, the details of the remapping function or of alternative techniques will not be described in more detail.

As mentioned above, a resolution is selected for the flattened image which is higher than the native resolution of the photodetector 50, thereby enhancing the resolution available in the digital camera 10. To select this higher resolution, the best resolution of the magnified region of the fisheye image may be selected. This selection of the best resolution may be understood by considering resolution in terms of the field of view of the fisheye lens 16. (To simplify the description, a cross-section of the field of view will be discussed.) In a normal lens assembly 14 with no fisheye effect, each degree of the field of view will be assigned an equal share of the photodetector 50. For a lens assembly 14 with a field of view of 90 degrees, each one-degree wedge of image light coming into the lens will be focused onto one ninetieth of the photodetector. This means that the resolution used to capture each part of the image, formed by each one-degree wedge of image light, is the same. With a fisheye lens 16, a one-degree wedge captured near the center point of the lens 16 will be assigned a larger share of the photodetector 50, while a one-degree wedge captured near the edge of the lens 16 will be assigned a smaller share of the photodetector 50. Thus, the apparent resolution near the center point is greater than that at the edges. In other words, parts of the image captured near the center point of the fisheye lens 16 are assigned more pixels and have a higher effective resolution than parts of the image captured near the edges of the fisheye lens 16.

To select the best resolution then, the resolution of the electronic image at the center point of the fisheye lens 16 may be selected. This means that during the flattening operation, the image at the center point of the fisheye lens 16 will not be compressed (or expanded), but will remain the same. The rest of the image around the edges will be expanded so that the flattened image has the same resolution as the center had before flattening.

Note that if a continuous flattening function is used, this best resolution will be the resolution at a theoretical point at the center point of the fisheye lens, and that no single pixel will actually be entirely at that resolution (due to the discrete nature of the pixels in the photodetector 50). In actual practice then, selecting the best resolution at the center point of the fisheye lens means selecting a resolution that substantially precludes compressing any of the image during flattening. For example, the flattening may be performed as described above by mapping each pixel in the unflattened electronic image to a new location, spreading them all out from the center. Those near the center may be spread such a small amount as to result in no practical movement at all, while those near the edges may be spread a great deal. Thus, the highest resolution has been selected, that at the center point of the fisheye lens 16.

In an alternative embodiment, if selecting the best resolution results in excessive dispersal of the pixels near the edge of the image, a somewhat lower resolution may be selected. In this case, pixels near the center of the image in the magnified region would actually be compressed somewhat during the flattening process in order to prevent spreading pixels at the edges too greatly. However, careful design of the fisheye lens 16 should prevent the need to select a resolution that is less than the best possible.

Once this type of remapping operation is performed, resulting in a spread pattern of pixels as in the matrix 140 of FIG. 7, the image may be filtered for several purposes, such as calculating pixel values for each pixel (e.g., 154) in the flattened image matrix 140 based on the spread-out pixels (e.g., 146, 150, and 156) projected from the fisheye image matrix 130. For example, the pixels may not be spread into locations corresponding to actual pixel locations in the grid of the flattened image. In fact, several spread pixels (e.g., 146 and 150) may partially overlap a single pixel location (e.g., 152) in the flattened image, so a filter may be applied that considers the values in the spread pixels (e.g., 146 and 150) to calculate the value for the single pixel location (e.g., 152) in the flattened image. Other pixel locations (e.g., 154) in the flattened image may correspond only partially to a spread pixel (e.g., 156), or may not have any spread pixels mapped over them, so the filter may have to consider pixels spread over neighboring pixel locations to interpolate between them.

For the purposes of this disclosure, filtering or processing the fisheye image to enhance resolution is equivalent to creating a new higher resolution image based on the fisheye image. That is, it is not important whether a new image is created based on the fisheye image or the fisheye image is simply resampled or otherwise processed to enhance its resolution.

These types of filtering operations (e.g., interpolating and resampling) are commonly performed using convolutions, among other techniques. In a standard image filter using a convolution, a matrix kernel is used, multiplying each pixel in an area centered around the pixel location in question by a given value in the matrix kernel, then summing the results to calculate a new value for the pixel location in question. In this case, because spread pixels may not correspond exactly to neighboring pixels under the matrix kernel, other convolution techniques or interpolation techniques may be used as needed.

This interpolation to calculate values for the pixels (e.g., 154) in the higher resolution flattened image digitally enhances the resolution of portions of the image which were compressed by the fisheye lens 16, thereby matching the best optically enhanced resolution.

Figure 8:
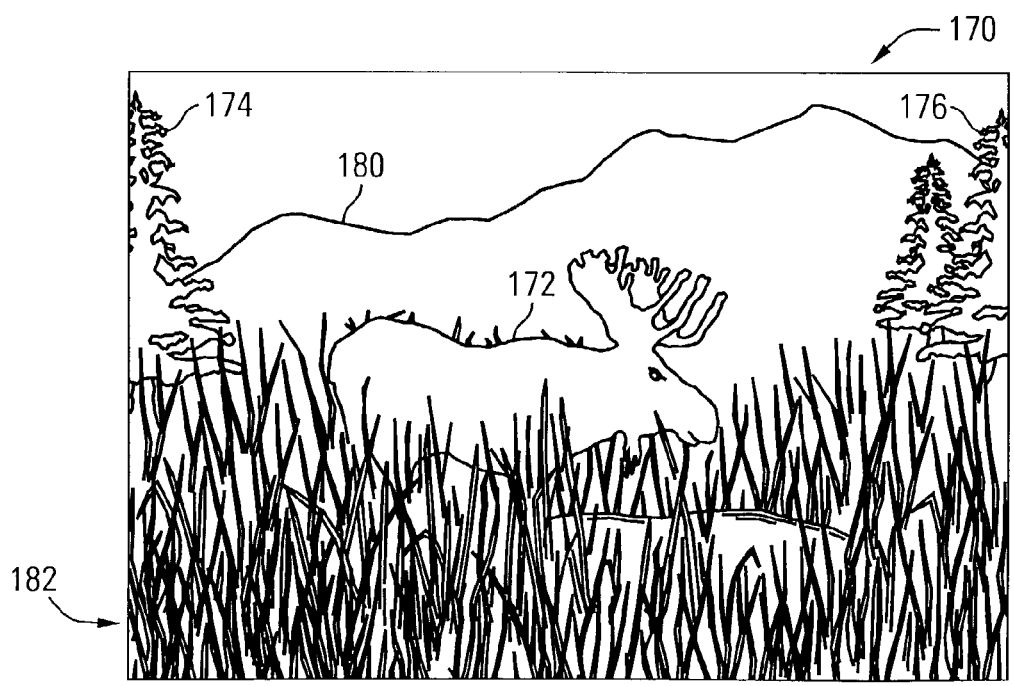
FIG. 8 is an exemplary corrected view of the image of FIG. 5 with the fisheye effect removed (note that the size of the image does not reflect the increased resolution)

An exemplary flattened version 170 of the fisheye image 110 of FIG. 5 is shown in FIG. 8. (The size of the flattened image 170 in FIG. 8 relative to the size of the fisheye image 110 in FIG. 5 does not reflect the enhanced resolution of the flattened image 170.) Note that the fisheye effect that magnified the moose 112 has been removed, resulting in a normal view of the moose 172. Similarly, the fisheye effect is removed from the compressed trees 114 and 116, mountain 120 and grass 122, resulting in a normal view of the trees 174 and 176, mountain 180 and grass 182. (As discussed above, the fisheye effect that magnified the moose 112 is removed not by removing the magnification, but by digitally magnifying the compressed regions of the fisheye image 110 to match.)

The center point of the fisheye lens 16 as been frequently referred to above, and merits further discussion. In a typical fisheye lens, the center point is located on the optical axis of the lens, but the fisheye lens 16 is not limited to this configuration. In fact, other optical configurations may be desirable in the fisheye lens 16. Therefore, the term "center point" as used herein refers to the point at which the magnification is greatest in the fisheye image. The center point then may actually be at the optical axis of the fisheye lens 16 so that it is focused onto the center of the photodetector 50, or it may be located at any desired location in the image, according to the design of the fisheye lens 16. It is even possible that multiple points of peak magnification are provided in the fisheye lens 16, so that one or more of these points is a center point for the fisheye lens 16.

The placement of center points at locations other than the optical axis of the fisheye lens 16 may be accomplished either careful design of the optical characteristics of the fisheye lens 16, or by the alignment of the photodetector 50 relative to the fisheye lens 16. For example, the photodetector 50 need not capture the entire image produced by the fisheye lens 16, so the fisheye lens 16 and lens assembly 14 may be designed to focus the image so that it overlaps the photodetector 50. If the center of the photodetector 50 is laterally shifted slightly away from the optical axis of the lens assembly 14 and fisheye lens 16, the center point of the fisheye lens 16 will be offset from the center of the image.

Overlapping the fisheye image on the photodetector 50 may also aid in generating a full-frame fisheye image having a smooth gradient from magnification to compression that can readily be flattened.

Figure 9A:
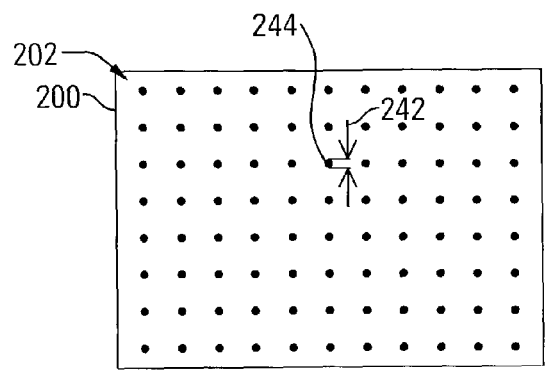
FIG. 9A is a view of an exemplary image of a grid of dots taken in landscape orientation through a standard non-fisheye lens, illustrating a native resolution of a photodetector in an electronic imaging device.

The placement of center points at locations other than the optical axis of the fisheye lens 16 is illustrated in FIGS. 9A–9D. FIG. 9A contains an exemplary image 200 of a grid of dots 202 captured in landscape orientation through a standard non-fisheye lens, illustrating a native resolution of a photodetector in the digital camera 10. The image contains an 8×11 grid of dots 202, showing the distribution of the grid 202 when the image is captured without a fisheye lens 16.

Figure 9B:
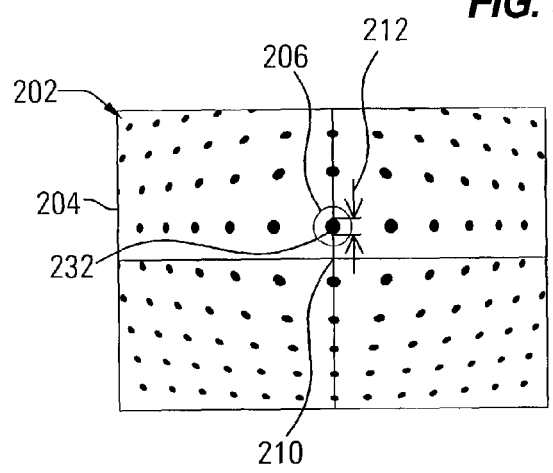
FIG. 9B is a view of the exemplary image of FIG. 9A, taken in landscape orientation through a fisheye lens, illustrating an exemplary center point location of the fisheye lens.

FIG. 9B contains an exemplary image 204 of the same grid of dots 202, captured in landscape orientation through the fisheye lens 16. The image 204 illustrates an exemplary center point location of the fisheye lens 16, wherein the center point 206 of the fisheye lens 16 is not aligned on the center 210 of the image 204. Rather, the center point 206 is positioned on a vertical short axis 212, just above a horizontal long axis 214. The center point 206 may be seen in the image 204 by noting that at that point 206 the grid appears to have the greatest magnification. That is, the spherical appearance of the grid is visually centered at that point 206. In alternative embodiments having differently shaped regions of magnification, the center point location may not be as readily visible, but may be determined during the design process of the fisheye lens 16 as noted previously.

When the digital camera 10 is held in landscape mode, subjects are often centered horizontally, placing their center on the short axis 212, but often extend above the vertically centered long axis 214. Placing the center point 206 on the short axis 212 above the long axis 214 ensures that the region of the image 204 that most often contains the subject will receive the greatest amount of optical magnification.

Figure 9C:
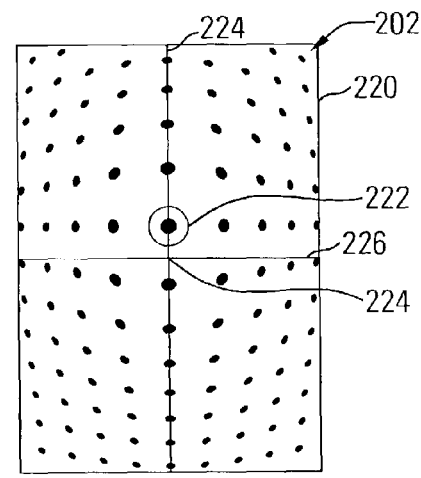
FIG. 9C is a view of the exemplary image of FIG. 9A, taken in portrait orientation through a fisheye lens, illustrating an exemplary center point location of the fisheye lens.

Similarly, FIG. 9C contains an exemplary image 220 of the same grid of dots 202, captured in portrait orientation through the fisheye lens 16. Note that the center point 222 of the fisheye lens 16 is not aligned on the center 224 of the image 220. Rather, the center point 222 is positioned on a vertical long axis 224, just above a horizontal short axis 226. When the digital camera 10 is held in portrait mode, as in landscape mode, subjects are often centered horizontally, placing their center on the long axis 224, but often extend above the vertically centered short axis 226. Placing the center point 222 on the long axis 224 above the short axis 226 in portrait mode ensures that the region of the image 220 that most often contains the subject will receive the greatest amount of optical magnification.

Figure 9D:
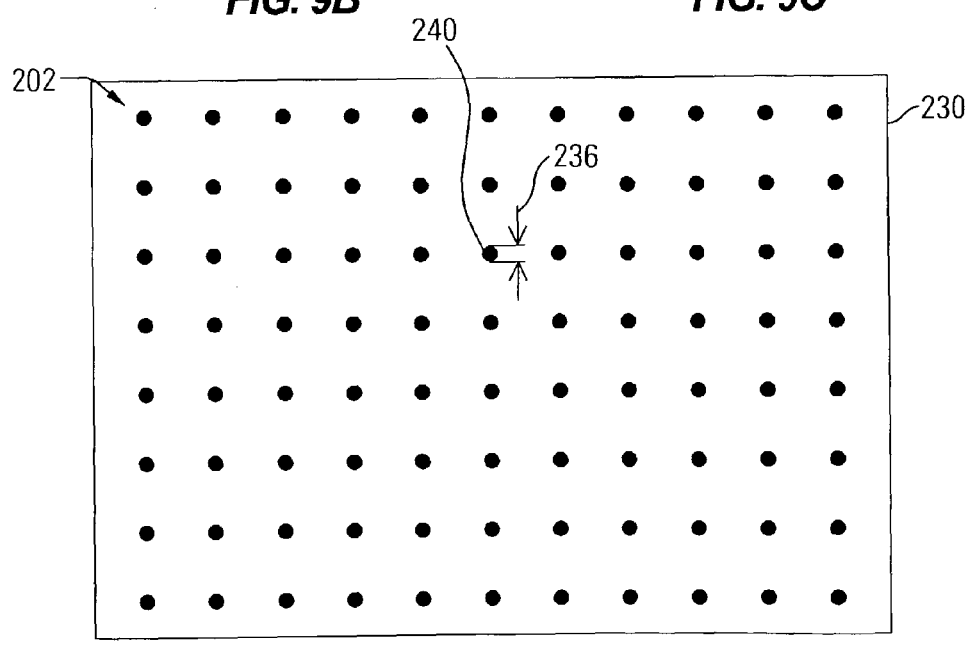
FIG. 9D is a view of the exemplary image of FIG. 9B after having been flattened and resampled at the highest resolution at the center point of the fisheye lens (with the size reflecting the increased resolution)

FIG. 9D contains a flattened version 230 of the fisheye image 204 captured landscape orientation shown in FIG. 9B. The fisheye effect has been electronically removed as described above, so that the spherical warping has been removed and the center point 206 is indistinguishable from the rest of the image 230. The flattened image has the same resolution, or PPI, as that at the center point 206 in the fisheye image 204. This can be seen by noting that the dot 232 at the center point 206 of the fisheye image 204 has the same height 234 as that 236 of the corresponding dot 240. The heights 234 and 236 of the dots 232 and 240 appear the same in the fisheye image 204 and flattened image 230 because the resolution of the flattened image 230 is that at the center point 206 of the fisheye image 204, and the dot 232 in the fisheye image 204 is located at the center point 206. In contrast, note that the height 242 of the same dot 244 in the original image 200 captured without the fisheye lens 16 is much smaller. In fact, the difference in size between the original image 200 captured without the fisheye lens 16 and the flattened image 230 illustrates the resolution enhancement provided by the fisheye lens 16. The image 230 with enhanced resolution in FIG. 9D is larger than the original non-enhanced image 200 in FIG. 9A, because the resolution is higher and the images are displayed with the same number of dots-per-inch in FIGS. 9A and 9D. The degree to which the resolution is enhanced is dependent upon the magnification provided by the fisheye lens 16 and upon how much the compressed region can be digitally magnified.

Figure 10:
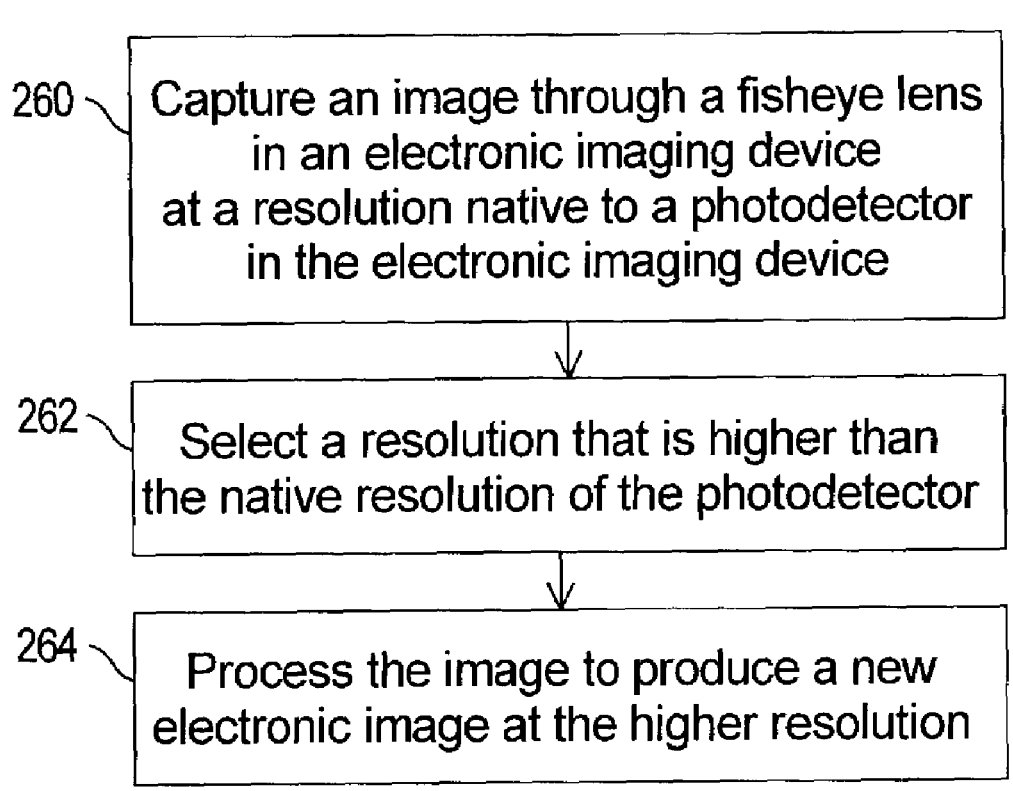
FIG. 10 is a flowchart summarizing an exemplary operation for enhancing resolution in an electronic imaging device using a fisheye lens.

The resolution enhancement operation in the digital camera 10 is summarized in the flowchart of FIG. 10. An image is captured 260 through a fisheye lens in an electronic imaging device at a resolution native to a photodetector in the electronic imaging device. A resolution is selected 262 that is higher than the native resolution of the photodetector. This higher resolution may be selected, as described above, by mapping pixels in the fisheye image outward from the center point. The higher resolution may alternatively be selected as any resolution higher than that native to the photodetector. Finally, the image is processed 264 to produce a new electronic image at the higher resolution, removing the fisheye effect and digitally magnifying portions of the image that were compressed by the fisheye lens.

While illustrative embodiments of the invention have been described in detail herein, it is to be understood that the inventive concepts may be otherwise variously embodied and employed, and that the appended claims are intended to be construed to include such variations, except as limited by the prior art.

What is claimed is:

1. An electronic imaging device, comprising:
   a photodetector;
   a fisheye lens; and
   an image processing system, said image processing system comprising instructions for electronically filtering an image captured by said photodetector to remove a fisheye effect caused by said fisheye lens, wherein a filtered image has a higher resolution than said image, said electronic imaging device having a portrait mode and landscape mode, so that a long axis of said photodetector is oriented vertically in said portrait mode and a short axis of said photodetector is oriented vertically in said landscape mode, and wherein said fisheye lens is centered on said long axis and above said short axis when said electronic imaging device is in said portrait mode.

2. The electronic imaging device of claim 1, further comprising a lens assembly.

3. The electronic imaging device of claim 2, wherein said fisheye lens is mounted adjacent said lens assembly so that an optical path to said photodetector passes through said lens assembly and said fisheye lens.

4. The electronic imaging device of claim 2, wherein said fisheye lens is movably mounted adjacent said lens assembly, said fisheye lens being movable between a first position and a second position.

5. The electronic imaging device of claim 4, wherein an optical path to said photodetector passes through said lens assembly and said fisheye lens when said fisheye lens is in said first position.

6. The electronic imaging device of claim 4, wherein an optical path to said photodetector passes through said lens assembly but not said fisheye lens when said fisheye lens is in said second position.

7. An electronic imaging device, comprising:
   a photodetector;
   a fisheye lens; and
   an image processing system, said image processing system comprising instructions for electronically filtering an image captured by said photodetector to remove a fisheye effect caused by said fisheye lens, wherein a filtered image has a higher resolution than said image, said electronic imaging device having a portrait mode and landscape mode, so that a long axis of said photodetector is oriented vertically in said portrait mode and a short axis of said photodetector is oriented vertically in said landscape mode, and wherein said fisheye lens is centered on said short axis and above said long axis when said electronic imaging device is in said landscape mode.

* * * * *